United States Patent
Birk

[11] 3,760,883
[45] Sept. 25, 1973

[54] QUICK HITCH ASSEMBLY
[75] Inventor: Billy D. Birk, Wamego, Kans.
[73] Assignee: Balderson, Inc., Wamego, Kans.
[22] Filed: Mar. 27, 1972
[21] Appl. No.: 238,208

[52] U.S. Cl.................. 172/273, 214/145, 280/479
[51] Int. Cl............................................ A01b 51/00
[58] Field of Search................... 172/272, 273, 274, 172/275; 214/145, 778, 780; 37/118, 117.5; 280/479; 296/35

[56] References Cited
UNITED STATES PATENTS
3,417,886  12/1968  Stuart............................ 172/272 X
3,272,264  9/1966  Antolini............................ 172/273
3,556,323  1/1971  Heimmermann.................. 214/145
2,710,464  6/1955  Husting........................... 172/275 X
3,204,793  9/1965  Lane................................... 214/778

Primary Examiner—Robert E. Pulfrey
Assistant Examiner—Stephen C. Pellegrino
Attorney—A. Donald Messenheimer

[57] ABSTRACT

A quick hitch assembly for connecting and disconnecting implements such as snow plows, buckets, blades and the like to the front of a wheeled or track type vehicle. A single, vertically mounted, hydraulic cylinder is connected by a pair of linkage mechanisms to selectively actuate a pair of lock pins which are mounted for horizontal reciprocal sliding movement.

8 Claims, 4 Drawing Figures

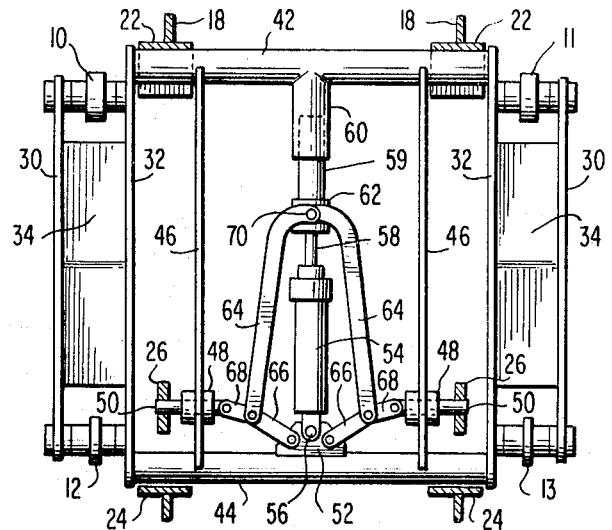
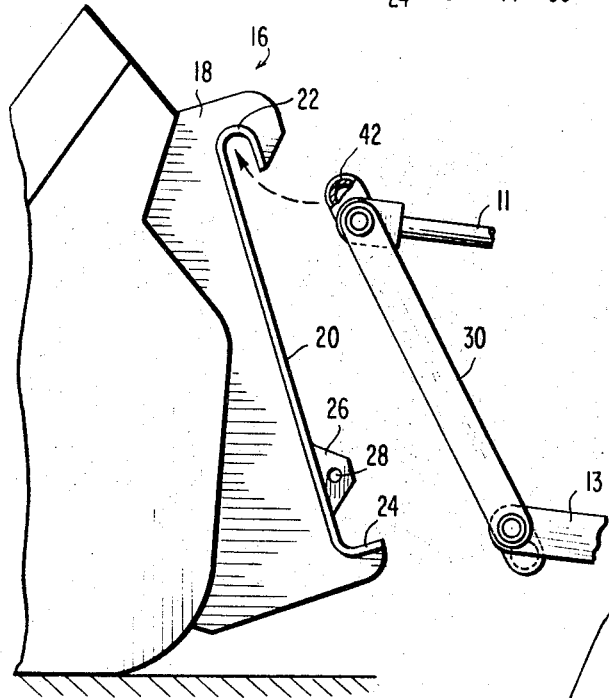
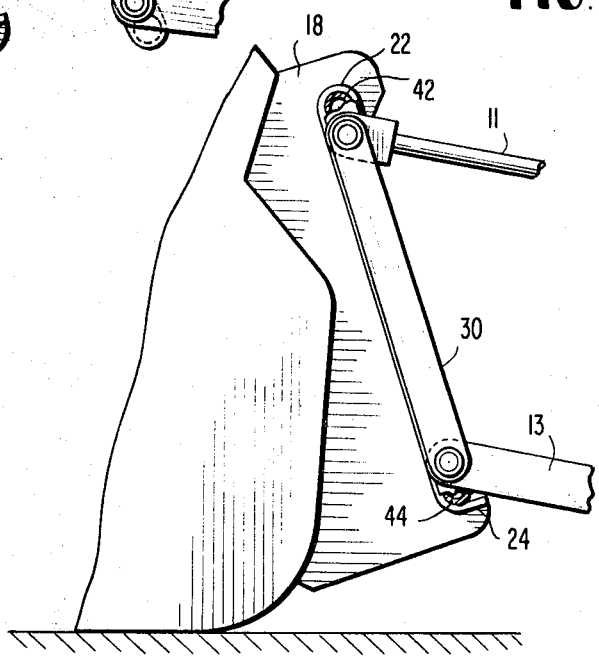

QUICK HITCH ASSEMBLY

The present invention relates to a quick hitch assembly for automatically attaching an earthworking implement to a vehicle or tractor.

The problem of quickly attaching and detaching various implements to the forward portions of tractors and the like has been considered in the past and efforts to deal with the problem are reflected by prior art patents such as U.S. Pat. No. 3,389,819 to Schumacher et al. and U.S. Pat. No. 3,233,350 to Malzahn. These prior efforts characteristically utilize an attaching mechanism located on the implement which is brought into supporting relationship with a complementary hooking portion secured to the vehicle. Once initial alignment has been made, the earthworking implement is elevated by the vehicle until the earthworking implement is completely supported by the vehicle. To positively secure the implement to the vehicle, an additional step of inserting locking pins has been required. This insertion operation generally has required the manual insertion of locking pins in aligned portions of the attaching assembly. It can be appreciated that a considerable amount of time can be required, and inconvenience incurred, especially in inclement weather, to properly secure these devices.

An attempt at further automating the implement attaching operations has been to utilize hydraulic cylinders to insert and remove the locking pins after proper alignment has been accomplished. Apparatus of this general type is shown in the Lane U.S. Pat. No. 3,204,793 and the Behnke et al U.S. Pat. No. 2,231,875. These systems employ horizontally disposed control cylinders whose piston rods effect lateral movement to the pin for direct locking engagement between the implement and the vehicle. The lock pins are subjected to forces, not only when connecting and disconnecting the implement from the vehicle, but also during operation of the vehicle with the implement in place, which may be sufficient to cause damage to the cylinders and piston rod assemblies. Additionally, misalignment of the pins with the pin receiving apertures when actuating the hydraulic cylinder can cause damage to the actuator which is connected directly to the piston.

It is accordingly the object of the present invention to provide a novel quick hitch assembly to effect locking and unlocking of an implement to a vehicle by means of a remotely controlled power actuator while isolating the actuator from damage from shock, misalignment or stress during use of the vehicle and implement.

This and other objects of the invention will become more fully apparent from the claims and from the description as it proceeds in conjunction with the appended drawings, in which:

FIG. 2 is a front elevation of the portion of the hitch assembly which is attached to the vehicle and showing also the engaging parts of the portion of the implement;

FIG. 3 is a partial side elevation which indicates the relative movement for coupling the portions of the hitching assembly together; and FIG. 4 is a partial side elevation showing the two portions of the hitch assembly connected together.

Figure 1:
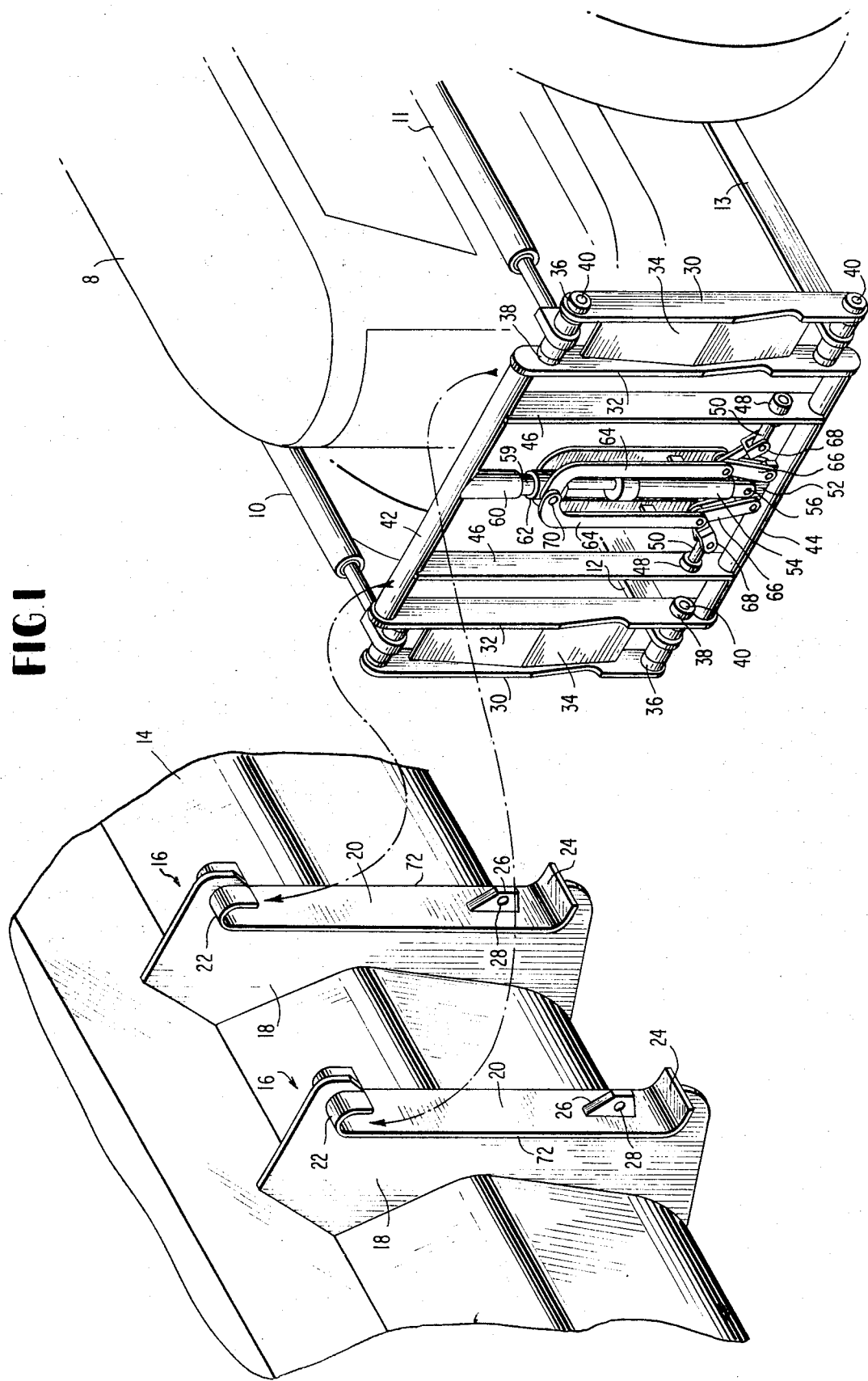
FIG. 1 is a pictorial view showing the two portions of the quick hitch assembly according to the invention, one portion being on the front of a vehicle and the other portion attached to the rear side of the implement.

Referring now to FIG. 1, the tractor or other driving vehicle 8 is adapted with upper arms 10 and 11, and lower arms 12 and 13, which are conventionally connected to hydraulic cylinders (not shown) controlled by the vehicle operator. The implement 14, which may be a snow plow, bucket, or the like, is adapted to be selectively attached to the vehicle 8. Implement 14 is provided with a pair of identical hook assemblies 16 which include a plate 18 shaped to fit and welded to the rear surface of the implement 14. A support member 20 is secured as by welding to the plate 18 and has an upper hook portion 22 which may have a cylindrical shape, a lower support portion 24, and a plate member 26 having a locking pin receiving bore 28.

The portion of the quick hitch assembly of the present invention next described attaches in a semi-permanent manner to the front of the vehicle 8 and is illustrated in FIGS. 1 and 2. On each side, a mounting frame portion includes a pair of vertical bar members 30 and 32 joined along their lengths by a spacer strap 34 which holds members 30 and 32 substantially parallel. The upper and lower ends of bar members 30 and 32 are provided with apertures that contain bushings 36 and 38 and a pin 40 which is adapted to be inserted through the bushings and held in place by a suitable fastener (not shown). When the pins 40 are installed through apertures in the end of the vehicle arms 10-13, the vehicle portion of the hitch assembly is in place and can be used with any implement or ground working tool that has been provided, as with the hook assembly 16, as described above.

The hitch assembly further comprises an upper cross bar 42 which is secured to the upper ends of bar members 32 and may be cylindrical to provide an upper rounded surface which has a diameter slightly smaller than the inside diameter of the hook portion 22 on the implement 14. A lower cross bar 44, also having a cylindrical cross section which serves as an abutment means, is secured to the lower ends of the bar 32.

A pair of pin guide support members 46, spaced inwardly from their corresponding vertical bar members 32, are secured as by welding at their upper and lower ends to upper and lower cross bars 42 and 44. Pin guide support members 46 each have a lock pin bushing 48 mounted so as to be in alignment with aperture 28 in the plate member 26 of the hook assembly on the implement 14. A separate lock pin 50 is mounted for horizontal sliding movement through each of the bushings 48 and into or out of engagement with aperture 28 in plate 26. Bushings 48 fully protect lock pins 50 when the pins are in the position illustrated in FIG. 1.

At the center of lower cross bar 44 is located an apertured plate 52. A hydraulic cylinder 54 has one end secured to plate 52 as by a pin 56 and its piston rod 58 which has a portion 59 extending vertically upwardly and sliding into a hollow cylindrical guide member 60. Guide member 60 may be a section of hollow pipe secured as by welding to the mid-portion of upper cross bar 42. The length of guide member 60 is chosen so that the upper end portion 59 of piston rod 58 always remains within the guide member 60 and thereby prevents any lateral forces on the pins 50 from deflecting the piston rod sufficiently to cause failure of the cylinder due to weakening of the seal caused by lateral movement of the piston.

Attached to piston rod 58 is a collar 62 which moves from an upper position, as illustrated in FIG. 1, to the lower position, as illustrated in FIG. 2. Movement of the piston rod 58 is controlled by the operator in the cab of the vehicle by conventional controls connected by hydraulic lines (not shown) extending between the cab and cylinder 54. The vertical movement of collar 62 is translated into a sliding movement of both locking pins 50 by a pair of three-link mechanisms which each include an upper link 64, a lower link 66, and a pin connecting link 68. The upper links 64, which may comprise a bifurcated member, or a pair of members as illustrated, each have an upper portion fitting on opposite sides of collar 62 and are connected by a pin 70 through the collar 62 and piston rod 58 to move with the piston. The lower end of upper link 64 is connected to the upper end of the lower link 66 and to one end of pin connecting link 68. The lower end of lower link 66 is pivotally connected to plate 52. The other end of pin connecting link 68 is pivotally connected to its corresponding pin 50. The axes of the piston rod 58 and the lock pins 50 all lie in the same vertical plane.

When the piston is extended upwardly, as illustrated in FIG. 1, the links 64, 66, and 68 assume a relative position, as illustrated in FIG. 1, with locking pins 50 in their retracted position. The pin connecting links extend upwardly relative to the axes of lock pins 50. When the vehicle operator actuates the hydraulic system to cause the pins 50 to move to a locking position, as illustrated in FIG. 2, the links 64, 66, and 68 assume the position illustrated in FIG. 2 and the locking pins 50 then extend into apertures 28 of plate members 26. The pin connecting links extend downwardly relative to the axes of lock pins 50.

The force tending to move the pins 50 is applied substantially along the axis of the lock pins 50 as link 66 swings about its pivot axis in plate 52 with the free end of link 66 moving downwardly across the center line of pin 50 to give a toggle locking action. External forces acting on the ends of lock pins 50 to push the pins out of their locking position are transmitted as a downwardly directed force on piston rod 58 which only further holds the piston in its desired position. The forward and rearword forces against pins 50 resulting during operation of the vehicle are substantially isolated from the piston rod 58 by reason of the arrangement of the pivot pin connections between the links 68 and 64 and collar 62. This reduces the risk of damage to the piston on cylinder 54.

Referring now also to FIGS. 3 and 4, in operation the vehicle is driven to the rear of the implement which is normally stored in the position where the vehicle can easily approach it from the rear. As the vehicle 8 is driven toward the hook assembly 16, the upper bar 42 is lowered sufficiently to fit under and into the hook portion 22, as illustrated by the arrow in FIG. 3. The outer edge surfaces 72 of support members 20 fit between vertical bar members 32 to align the implement and the vehicle. The hitch assembly on the vehicle is then raised sufficiently so that upper cross bar 42 fits into hook portions 22 and the lower hook portions 24 of the implement 14 engage the lower cross bar 44, as illustrated in solid lines in FIG. 4 to thereby cause plate members 26 to pass alongside of bushings 48 and align apertures 28 with pins 50. The operator, without disembarking from the vehicle, can operate the hydraulic supply to cylinder 54 to thereby extend pins 50 into apertures 28 and thus lock the implement onto the vehicle. The implement can be removed from the vehicle by a reverse sequence of operations and without the operator disembarking from the vehicle.

As is apparent from the foregoing, the present invention makes it possible for the operator of a wheeled or tracked vehicle to exchange implements without the assistance of another workman and without disembarking from the vehicle. By use of the cylindrical cross bars and the hook assembly on the implement, the operator is able to properly orient the implement on the front of the vehicle without the need for disembarking. Once the implement is properly oriented, the matter of actuating the hydraulic cylinder for moving the locking pins in position can be handled by the operator while in the cab of the vehicle. Any excessive load on the hydraulic cylinder and piston due to misalignment of or shock loading on the locking pins is transmitted to the piston at collar 62. However, since the free end of the piston is guided in a cylinder guide member 60, lateral displacement of the piston is prevented thereby protecting the hydraulic cylinder and piston seals from damage during operation of the vehicle with the implement.

The present invention may be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are intended to be embraced therein.

What is claimed and intended to be covered by Letters Patent is:

1. A quick hitch assembly for attaching an earthworking implement having a hook assembly to a vehicle comprising:

a frame assembly secured to movable arms on a vehicle, said frame assembly including:

a support bar extending generally horizontally and transverse to the direction of vehicle travel and engageable with an upper portion of said implement hook assembly; abutment means positioned below said support bar for supporting a lower portion of said implement hook assembly; and a remotely controlled locking means positioned between said support bar and said abutment means for locking said implement to said frame, said locking means comprising:

a power actuator having a piston and cylinder, means mounting said cylinder to said frame assembly;

a guide member secured to said frame assembly and having a configuration for slidingly receiving said piston and maintaining the axis of said piston in a generally vertical direction regardless of the position of the piston relative to the cylinder;

a pair of pin guide members mounted on said frame assembly;

a pair of lock pins mounted for substantially horizontal sliding movement in said guide members; and linkage means connected to said vertically movable piston rod and to said abutment means for imparting a horizontal movement to said lock pins for selective engagement by said pins with said implement hook assembly upon vertical movement of said piston rod.

2. The quick hitch assembly according to claim 1 wherein said implement is provided with a pair of substantially identical spaced hook assemblies each including hook means for engaging said support bar to thereby align the vehicle and the implement and a plate member extending in a substantially horizontal plane having a through bore, said bore having a substantially horizontal axis and a size sufficiently large to receive one of said lock pins.

3. A quick hitch assembly for attaching an earthworking implement having a hook assembly to a vehicle comprising:
- a frame assembly secured to movable arms on a vehicle, said frame assembly including:
- a support bar extending generally horizontally and transverse to the direction of vehicle travel and engageable with an upper portion of said implement hook assembly;
- abutment means positioned below said support bar for supporting a lower portion of said implement hook assembly; and
- a remotely controlled locking means positioned between said support bar and said abutment means for locking said implement to said frame, said locking means comprising:
  - a power actuator having a piston and cylinder mounted so that the piston rod moves in a generally vertical direction;
  - a pair of pin guide members mounted on said frame assembly;
  - a pair of lock pins mounted for substantially horizontal sliding movement in said guide members; and linkage means connected to said vertically movable piston rod and to said abutment means for imparting a horizontal movement to said lock pins for selective engagement by said pins with said implement hook assembly upon vertical movement of said piston rod, and said linkage means comprising:
    - a collar connected to said piston rod for vertical movement therewith;
    - a first pair of linkage arms pivotally connected at one end to said abutment means at different pivot axes and at the other end to a pivot pin associated with different ones of said lock pins;
    - a second pair of linkage arms pivotally connected at one end to said collar along the same pivot axis and at the other end to the respective pivot pins; and
    - a third pair of linkage arms pivotally connected at one end to their associated lock pin and at the other end to the respective pivot pins.

4. The quick hitch assembly according to claim 3 wherein the piston rod axis and the axes of the lock pins are coplanar, and the third pair of linkage arms extend above the lock pin axes when the lock pins are in their retracted position and are pivoted downwardly to extend below the lock pin axes when the lock pins are in their extended locking position.

5. The quick hitch assembly according to claim 3 wherein said implement is provided with a pair of substantially identical spaced hook assemblies each including hook means for engaging said support bar to thereby align the vehicle and the implement and a plate member extending in a substantially horizontal plane having a through bore, said bore having a substantially horizontal axis and a size sufficiently large to receive one of said lock pins.

6. A quick hitch assembly for securing an earthworking implement to a vehicle comprising in combination:
- a frame assembly secured to movable arms on a vehicle, said frame assembly including:
- a support bar having an axis extending generally horizontally and transverse to the direction of vehicle travel;
- abutment means spaced below said support bar;
- means for locking said implement to said frame assembly including:
  - a power actuated cylinder assembly having a piston rod mounted for guided movement in a substantially vertical direction;
  - a pair of lock pins mounted for horizontal reciprocating movement in guides secured to said frame assembly; and
  - linkage means connected to said piston rod and said abutment means for selectively moving said lock pins into and out of lock positions with movement of said piston rod; and
- a hook assembly secured to the rear portion of said implement including:
  - a pair of spaced members secured to said implement and extending rearwardly from said implement;
  - an upper hook portion supported at the rear of each of said spaced members and adapted to engage said support bar and when engaged to limit relative movement between the implement and vehicle to allow pivotal movement about the horizontal axis of said support bar;
  - a lower support portion at the rear of each of said spaced members and adapted to engage said abutment means to limit the rearward movement of the lower portion of said implement; and
  - means mounted on the lower portion of each of said spaced members for receiving said lock pins to limit forward movement of the lower portion of said implement.

7. The quick hitch assembly according to claim 6 wherein said linkage means comprises:
- a collar connected to said piston rod for vertical movement therewith;
- a first pair of linkage arms pivotally connected at one end to said abutment means at different pivot axes and at the other end to a pivot pin associated with different ones of said lock pins;
- a second pair of linkage arms pivotally connected at one end to said collar along the same pivot axis and at the other end to the respective pivot pins; and
- a third pair of linkage arms pivotally connected at one end to their associated lock pin and at the other end to the respective pivot pins.

8. The quick hitch assembly according to claim 7 wherein the piston rod axis and the axes of the lock pins are coplanar, and the third pair of linkage arms extend above the lock pin axes when the lock pins are in their retracted position and are pivoted downwardly to extend below the lock pin axes when the lock pins are in their extended locking position.

* * * * *